United States Patent
Schierling

[11] Patent Number: 6,138,806
[45] Date of Patent: Oct. 31, 2000

[54] CLUTCH DISK WITH VARIED FRICTION VALUES

[75] Inventor: Bernhard Schierling, Kürnach, Germany

[73] Assignee: Mannesmann Sachs AG, Schweinfurt, Germany

[21] Appl. No.: 09/008,681

[22] Filed: Jan. 16, 1998

[30] Foreign Application Priority Data

Jan. 16, 1997 [DE] Germany ............... 197 01 292

[51] Int. Cl.$^7$ ................................ F16D 13/24
[52] U.S. Cl. ..................... 192/70.14; 192/107 R
[58] Field of Search ................. 192/107 M, 107 R, 192/70.14, 107 C

[56] References Cited

U.S. PATENT DOCUMENTS

| | | |
|---|---|---|
| 2,135,126 | 11/1938 | Harwood . |
| 2,902,130 | 9/1959 | Halberg et al. . |
| 3,552,533 | 1/1971 | Nitz ............................. 192/107 M X |
| 4,202,432 | 5/1980 | Komori ......................... 192/107 M |
| 4,305,494 | 12/1981 | Ishida et al. ................... 192/107 M |
| 4,469,206 | 9/1984 | Motomura et al. . |
| 4,741,424 | 5/1988 | Kitano et al. .................. 192/107 M |
| 4,846,326 | 7/1989 | Tilton et al. ................... 192/107 M X |
| 4,951,793 | 8/1990 | Hays ............................. 192/107 M X |
| 5,053,261 | 10/1991 | Nishimura et al. . |
| 5,154,683 | 10/1992 | Phelps .......................... 192/107 M X |
| 5,337,873 | 8/1994 | Thirion de Briel . |
| 5,732,809 | 3/1998 | Drexl ............................ 192/70.14 |

FOREIGN PATENT DOCUMENTS

| | | |
|---|---|---|
| 704 636 | 4/1996 | European Pat. Off. . |
| 34 09 868 | 9/1985 | Germany . |
| 27 16 462 | 10/1990 | Germany . |
| 41 30 984 | 3/1992 | Germany . |
| 2-278 022 | 11/1990 | Japan . |
| 1 415 193 | 11/1975 | United Kingdom . |
| 2 156 040 | 10/1985 | United Kingdom . |

*Primary Examiner*—Charles A Marmor
*Assistant Examiner*—Ha Ho
*Attorney, Agent, or Firm*—Cohen, Pontani, Lieberman & Pavane

[57] ABSTRACT

Friction facings of a clutch disk, especially for friction clutches in motor vehicles, wherein the friction coefficient varies along the radial extension of the friction facings such that the friction coefficient in the radial outer region has a lower value than the friction coefficient in the radial inner region.

3 Claims, 2 Drawing Sheets

CLUTCH DISK WITH VARIED FRICTION VALUES

BACKGROUND OF THE INVENTION

1. Field of the Invention

The invention is directed to a clutch disk for a friction clutch of a motor vehicle.

2. Discussion of the Prior Art

It is known from German Offenlegungsschrift 34 09 868 to use friction elements having different friction surface regions with different friction coefficients in friction arrangements in clutch disks for damping torsional vibrations. After assembling this clutch disk, it is possible to subsequently adapt the desired or required friction force in that the friction surface regions can be selectively brought into a friction-damping working connection with the disk parts.

SUMMARY OF THE INVENTION

The object of the present invention is to provide an improved clutch disk that ensures perfect torque transmission without malfunction also during sudden thermal loading (such as caused by repeated successive starts on a hill).

Pursuant to this object, and others which will become apparent hereafter, one aspect of the present invention resides in a clutch disk, in particular for a friction clutch of a motor vehicle, which clutch disk is comprised of a hub with an internal toothing that is fittable to a transmission shaft so as to be rotatably fixed relative to the transmission shaft, at least one facing carrier or facing carrier segments which is/are connected with the hub so as to be rotatably fixed relative thereto, and at least one friction facing ring or a plurality of friction facing elements arranged circumferentially one behind the other. The at least one friction facing ring or the friction facing elements being configured to have a friction coefficient that varies along a radial extension of the facing ring or facing element.

The friction coefficient of the friction facing rings or of the friction facing elements, respectively, is produced so as to be different in the radial extension thereof. Due to the fact that the friction coefficient of the clutch disk varies along its radial extension, it is possible to overcome influences which diminish torque in that a torque transmission takes place at the locations on the friction facing rings provided with the higher friction coefficient under extreme thermal operating situations. For example, when repeatedly starting a fully loaded vehicle on a hill, a protection of the contact pressure plate takes place such that the clutch disk is no longer perfectly tensioned along its entire radial extension and can only transmit torque over a partial region of its radius.

It is proposed, according to the invention, that the friction coefficient decreases radially outward. As a result of this unequal distribution of the friction coefficient along the radius, it is possible to proportion the transmission of torque in a favorable manner during the starting process, wherein the clutch exhibits good grab behavior in this operating state. During a sudden or shock-like thermal heating of the friction clutch of the kind mentioned above, the contact pressure plate protects itself so that it contacts the corresponding regions of the clutch disk substantially with the radial inner region of its friction surface during the engagement process. Accordingly, only a small average friction radius can be realized. However, the friction coefficient is highest at this location, so that the clutch can also transmit its full torque without impermissible slippage.

In a further embodiment of the invention the friction facing ring or friction facing elements has/have a smaller friction coefficient in its/their radial outer region than in its/their radial inner region. Due to this construction, a very favorable starting behavior is achieved during normal operation and faultless starting is still possible under extreme thermal loading, also without impermissible slippage.

According to another feature of the invention, the composition of the friction facing rings or friction facing elements in their radial outer region is different than that in their radial inner region. As a result of the different composition, it is possible to achieve a smaller friction coefficient in the radial outer region than in the radial inner region. An increase in the friction coefficient can be achieved, e.g., by the addition of corundum and/or by means of different grades of yarn.

In still another embodiment the friction facing rings or friction facing elements are constructed in two regions which are separate from one another and which are arranged radially one above the other. In this way, the individual separate regions which are arranged radially one above the other can be produced with different material composition from the outset in order to realize the desired friction coefficients.

In a clutch disk for a friction clutch in a motor vehicle comprising a hub with an internal toothing for the purpose of fitting to a transmission shaft such that it is fixed with respect to rotation relative thereto, and comprising at least one facing carrier or facing carrier segments which is/are connected with the hub so as to be fixed with respect to rotation relative thereto, possibly with the intermediary of a torsion damper, at least one friction facing ring or a plurality of friction facing elements arranged one behind the other along the circumference which can be tensioned axially between a friction surface of a flywheel and a contact pressure plate, it is advantageous for the transmission of torque that a) the friction surface of the contact pressure plate is conical in the thermally unloaded state such that the radial outer region is at a smaller distance from the friction surface of the flywheel than the radial inner region, and b) the friction region of the friction facing rings or friction facing elements is smaller in the radial outer region than in the radial inner region.

During normal operation in which torque transmission begins in the radial outer region, a construction of this type, on the one hand, enables a comfortable starting process, since the radial outer, lower friction coefficient has less of a tendency, or none at all, towards a grabbing of the friction facings during the starting process. On the other hand, the construction is also advantageous during a starting process under high thermal loading, since, in this case—also with protection of the contact pressure plate as a consequence of thermal loading—a sufficient torque transmission is made possible without additional slippage because the higher friction coefficient is effective in the radial inner region which is utilized increasingly for torque transmission in such an operating state.

The conicity of the friction surface of the contact pressure plate is in the order of magnitude of approximately 0.1 to 0.4 mm in this case.

The various features of novelty which characterize the invention are pointed out with particularity in the claims annexed to and forming a part of the disclosure. For a better understanding of the invention, its operating advantages, and

DETAILED DESCRIPTION OF THE PREFERRED EMBODIMENTS

Figure 1:
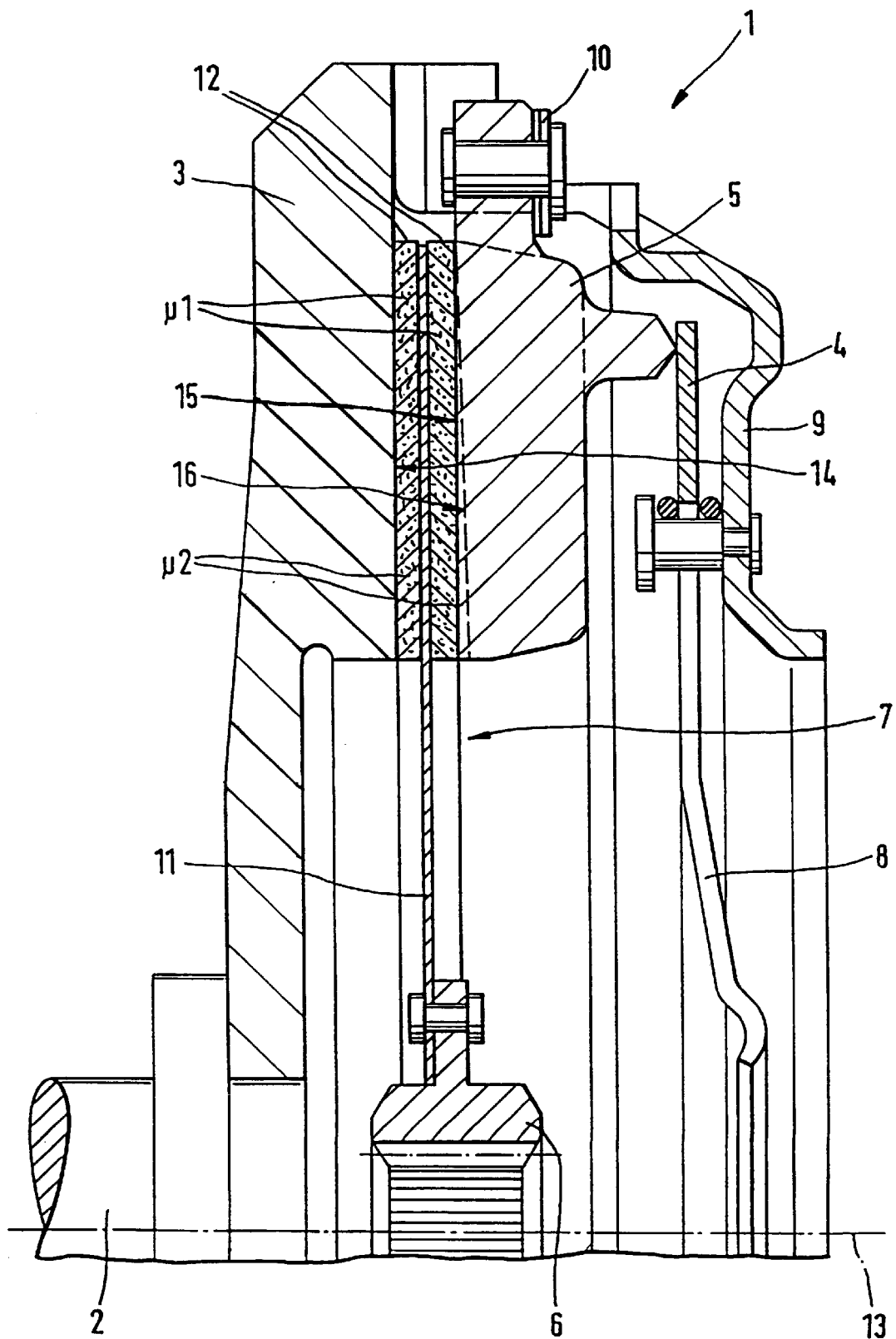
FIG. 1 is a section through a clutch disk pursuant to the present invention.
Figure 2:
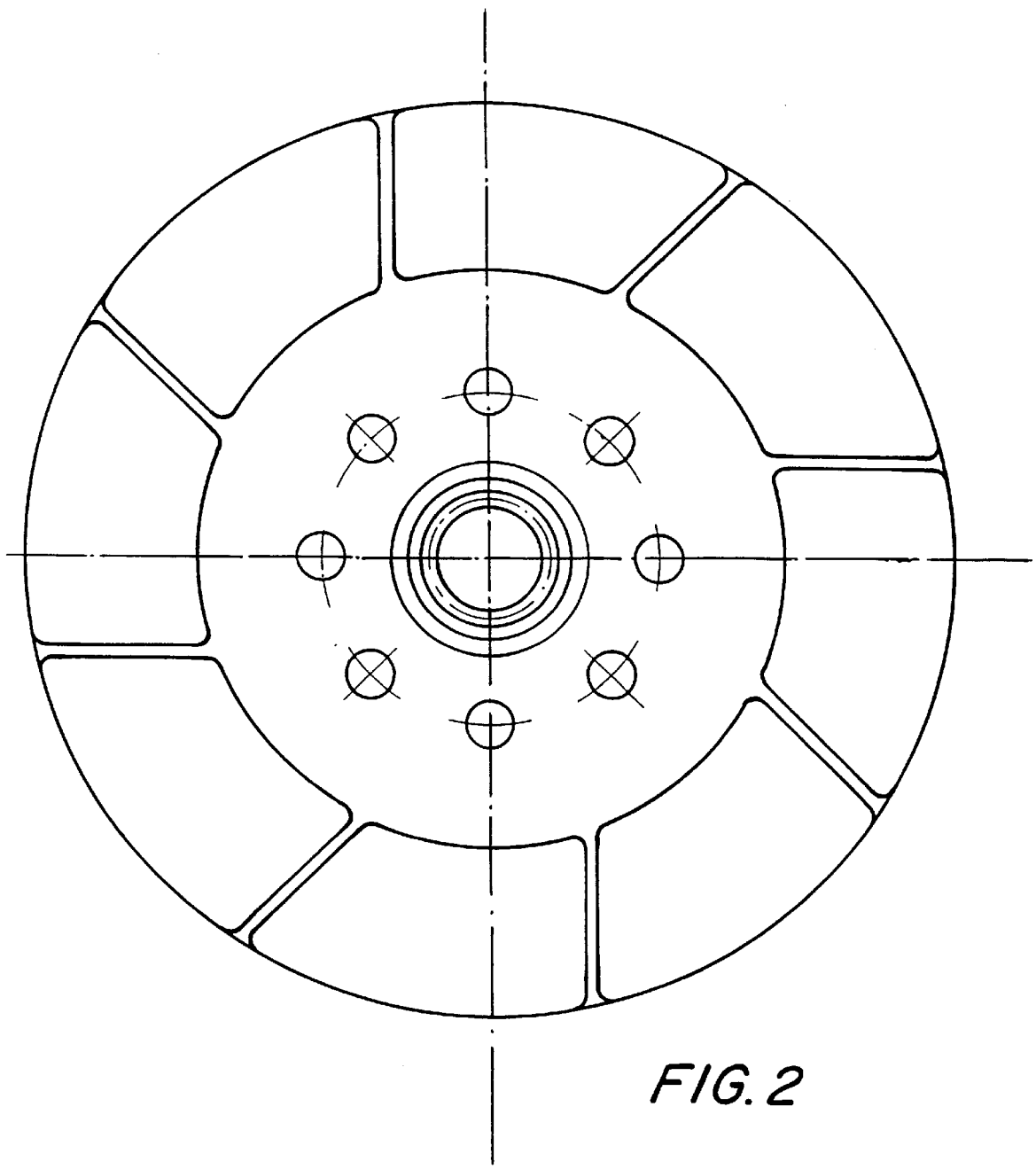
FIG. 2 is a plan view of another embodiment of the clutch disk.

FIG. 1 shows a friction clutch 1 in which a flywheel 3 is fastened to a crankshaft 2 of an internal combustion engine, not shown, and defines an axis of rotation 13. The flywheel 3 has a friction surface 14 for a clutch disk on the side of the flywheel 3 remote of the internal combustion engine. A clutch housing 9 is fastened to the flywheel 3 so as to enable a contact pressure plate 5 and a diaphragm spring 4 to be accommodated in the axial space between the clutch housing 9 and the friction surface 14. The contact pressure plate 5 is guided via tangential leaf springs 10 at the housing 9 so as to be fixed with respect to rotation, but so as to be axially displaceable, relative to the housing 9. The diaphragm spring 4 is supported on one diameter at the clutch housing 9 and, on a different diameter, loads the contact pressure plate 5 in the direction of the flywheel 3. The diaphragm spring 4 is provided radially inside with individual spring tongues 8. The contact pressure plate 5 has a friction surface 15 on its side facing the flywheel 3, which friction surface 15 substantially corresponds to the friction surface 14 of the flywheel 3 with respect to its radial extension. The friction facings 12 of a clutch disk 7 can be tensioned between the two friction surfaces 14 and 15, wherein the clutch disk 7 further comprises a hub 6 and a facing carrier 11.

The facing carrier 11 is provided with the two friction facings 12, extends radially inward and is fixedly connected with a hub 6 which is attached, via an internal toothing, to a transmission shaft, not shown, so as to be fixed with respect to rotation relative to it. A torsional vibration damper, for example, can be arranged between the friction facings 12 and the hub 6 in the path of the facing carrier 11. The friction facings 12 can also be constructed as circumferentially extending closed rings, but it is also possible to use individual friction facing elements which are spaced apart in the circumferential direction. In both cases, the material of the friction facings 12 is constructed so that it has a first friction coefficient $\mu_1$ in the radial outer region and a second friction coefficient $\mu_2$ in its radial inner region, wherein friction coefficient $\mu_2$ is greater than friction coefficient $\mu_1$. The friction facings 12 can be constructed in one piece along their radial extension and can be outfitted with the two different friction coefficients by appropriate composition of material. However, it is also possible to construct the friction facings 12 in two radial regions which are separate from one another, wherein the radial outer region is provided with friction coefficient $\mu_1$ and the radial inner region is provided with friction coefficient $\mu_2$.

Naturally, the facing carrier 11 can be formed of a plurality of facing carrier segments which are separated along the circumference and comprise a facing suspension.

As a result of the lower friction coefficient $\mu_1$ in the radial outer region, it is possible to produce a uniform and convenient friction engagement between the friction surfaces 14, 15 and the friction facings 12 during the starting process. In the event of a sudden high thermal loading of the friction clutch, the contact pressure plate 5 assumes a slightly conical shape such that its outer diameter is situated at a greater distance from the flywheel 3 than its inner diameter. The friction facings 12 are accordingly utilized for torque transmission only in their radial inner region, so that there is a smaller mean friction radius available, but also a greater coefficient of friction $\mu_2$ at the same time. These two steps can complement one another insofar as a faultless torque transmission is also possible during high thermal loading without excessive slip.

As is shown in dashed lines, the contact pressure plate 5 can advantageously be constructed in the region of its friction surface 16 in such a way that it is slightly conical in the unloaded state, namely so that the radial inner region of the friction surface 16 has a somewhat greater distance from the friction surface 14 of the flywheel 3 than the radial outer region. In particular, with respect to an axially acting suspension between the two friction facings 12, it can be ensured in this way that a comfortable starting process can be carried out during normal starting over the region with the lower friction coefficient $\mu_1$ and the friction surface 16 extends parallel to the friction surface 14 during high thermal loading of the clutch in which the contact pressure plate 5 is protected.

The invention is not limited by the embodiments described above which are presented as examples only but can be modified in various ways within the scope of protection defined by the appended patent claims.

I claim:

1. A clutch disk for a friction clutch in a motor vehicle, comprising:

a flywheel having a friction surface;

a contact pressure plate having a friction surface arranged opposite the flywheel friction surface;

a hub with an internal toothing fittable to a transmission shaft so as to be rotatably fixed relative to the transmission shaft, the transmission shaft having a longitudinal axis;

at least one facing carrier connected with the hub so as to be fixed with respect to rotation relative thereto; and at least one friction facing ring arranged perpendicular to the longitudinal axis so as to be axially tensionable between the friction surface of the flywheel and the contact pressure plate for a transmission of torque, the friction surface of the contact pressure plate being configured to be conical in a thermally unloaded state such that a radial outer region of the radial outer region of friction surface of the contact pressure plate is at a smaller distance from the friction surface of the flywheel than a radial inner region of the pressure plate friction surface so that the the contact pressure plate is first contactable with a radial outer region of the friction facing ring and under thermal loading the contact pressure plate completely contacts the friction facing, the friction facing ring having a friction coefficient that is smaller in the radial outer region than in a radial inner region.

2. A clutch disk according to claim 1, wherein there is a difference in distance between the radial outer region of the friction facing ring and the radial inner region of the friction facing ring, relative to the flywheel friction surface, that is approximately 0.1 mm to 0.4 mm.

3. A clutch disk according to claim 1, wherein the at least one friction facing ring is constructed as a plurality of friction facing elements arranged one behind the other in a circumferential direction of the friction facing ring.

* * * * *